United States Patent
Gilardino et al.

(10) Patent No.: US 10,933,702 B2
(45) Date of Patent: Mar. 2, 2021

(54) ROTARY JOINT ASSEMBLY FOR A TIRE INFLATION SYSTEM

(71) Applicant: DANA HEAVY VEHICLE SYSTEMS GROUP, LLC, Maumee, OH (US)

(72) Inventors: Luca Gilardino, Riva del Garda (IT); Giulio Ornella, Arco (IT); Jason M. Sidders, Perrysburg, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 489 days.

(21) Appl. No.: 15/750,743

(22) PCT Filed: Jul. 28, 2016

(86) PCT No.: PCT/US2016/044497
§ 371 (c)(1),
(2) Date: Feb. 6, 2018

(87) PCT Pub. No.: WO2017/023696
PCT Pub. Date: Feb. 9, 2017

(65) Prior Publication Data
US 2018/0208000 A1   Jul. 26, 2018

(30) Foreign Application Priority Data
Aug. 6, 2015 (EP) .................................. 15425061

(51) Int. Cl.
*B60C 23/00* (2006.01)
(52) U.S. Cl.
CPC ...... *B60C 23/003* (2013.01); *B60C 23/00309* (2020.05); *B60C 23/00318* (2020.05);
(Continued)

(58) Field of Classification Search
CPC ............ B60C 23/003; B60C 23/00381; B60C 23/0039; B60C 23/00309;
(Continued)

(56) References Cited

U.S. PATENT DOCUMENTS 1,103,833 A   7/1914 Ragan
4,844,138 A * 7/1989 Kokubu ................ B60C 23/003
                                                    152/417

(Continued)

FOREIGN PATENT DOCUMENTS

DE            4017788 A1   12/1991
JP            2002087029    3/2002
KR         20080006448 A    1/2008

OTHER PUBLICATIONS

European Patent Office, The International Search Report with Written Opinion issued in PCT/EP2016/044497, dated Oct. 21, 2016, 9 pages, European Patent Office, Rijswijk, Netherlands.
(Continued)

*Primary Examiner* — Scott A Browne
(74) *Attorney, Agent, or Firm* — McCoy Russell LLP

(57) ABSTRACT

A rotary joint assembly for a tire inflation system includes a rotating portion. The rotating portion is attached to a wheel rim for rotation therewith. The rotating portion includes a center portion which has an air passageway formed therein. The rotary joint assembly also includes a non-rotating portion. The non-rotating portion has a non-rotating portion air passageway formed therein. The non-rotating portion air passageway is in fluid communication with the air passageway formed in the rotating portion via a chamber. A pair of annular sealing members are attached to the rotating portion and sealingly contact a sealing surface of the non-rotating portion. The annular sealing members define an inboard end and an outboard end of the chamber.

20 Claims, 4 Drawing Sheets

(52) U.S. Cl.
CPC .. *B60C 23/00336* (2020.05); *B60C 23/00345* (2020.05); *B60C 23/00363* (2020.05)

(58) Field of Classification Search
CPC ........ B60C 23/00318; B60C 23/00336; B60C 23/00345; B60C 23/00363
See application file for complete search history.

(56) References Cited

U.S. PATENT DOCUMENTS

| | | | |
|---|---|---|---|
| 6,857,457 B2* | 2/2005 | Nienhaus | B60C 23/003 152/415 |
| 7,220,058 B2* | 5/2007 | Ruetter | B60C 23/003 152/415 |
| 2005/0205182 A1* | 9/2005 | Maquaire | B60C 23/003 152/417 |
| 2014/0028016 A1 | 1/2014 | Knapke | |

OTHER PUBLICATIONS

Korean Intellectual Property Office, Korean Office Action issue in Applicatioon No. 10-2018-7006516, dated Apr. 30, 2019, 15 pages.

\* cited by examiner

ROTARY JOINT ASSEMBLY FOR A TIRE INFLATION SYSTEM

CROSS-REFERENCE TO RELATED APPLICATION

This application is claiming the benefit, under 35 U.S.C. 119(a), of the European Patent Application which was granted Serial No. 15425061.7 and filed on Aug. 6, 2015, the entire disclosure of which is hereby incorporated by reference.

BACKGROUND OF THE INVENTION

This invention relates to a rotary joint assembly. In particular, this invention relates to a rotary joint assembly for a tire inflation system.

Tire inflation systems are becoming crucial for certain vehicles such as, for example, trucks, tractors and earth-moving vehicles. Tire inflation systems are utilized to measure and adjust the tire pressure to provide the vehicle with the versatility to maneuver over differing terrain types and reduce maintenance requirements. For example, the tire pressure of a wheel assembly in fluid communication with the tire inflation system may be lowered to provide additional traction for the vehicle or may be raised to reduce the rolling resistance of the vehicle. Rotary joints are utilized in tire inflation systems to enable fluid communication between non-rotating components and rotating components of the system.

The rotary joints known in the art are typically provided in an area between the spindle and the wheel hub. Unfortunately, these joints are permanently affixed to the vehicle and are limited by the spatial constraints of the area between the spindle and the wheel hub. Accordingly, it would be desirable to provide a rotary joint assembly that overcomes the deficiencies of the known designs.

BRIEF SUMMARY OF THE INVENTION

Embodiments of a rotary joint assembly for a tire inflation system are provided.

In an embodiment, the rotary joint assembly comprises a rotating portion attached to a wheel rim for rotation therewith. The rotating portion comprises a center portion which has an air passageway formed therein. The rotary joint assembly also comprises a non-rotating portion. The non-rotating portion has a non-rotating portion air passageway formed therein. The non-rotating portion air passageway is in fluid communication with the air passageway formed in the rotating portion via a chamber. A pair of annular sealing members are attached to the rotating portion and sealingly contact a sealing surface of the non-rotating portion. The annular sealing members define an inboard end and an outboard end of the chamber.

DETAILED DESCRIPTION OF THE INVENTION

Figure 1:
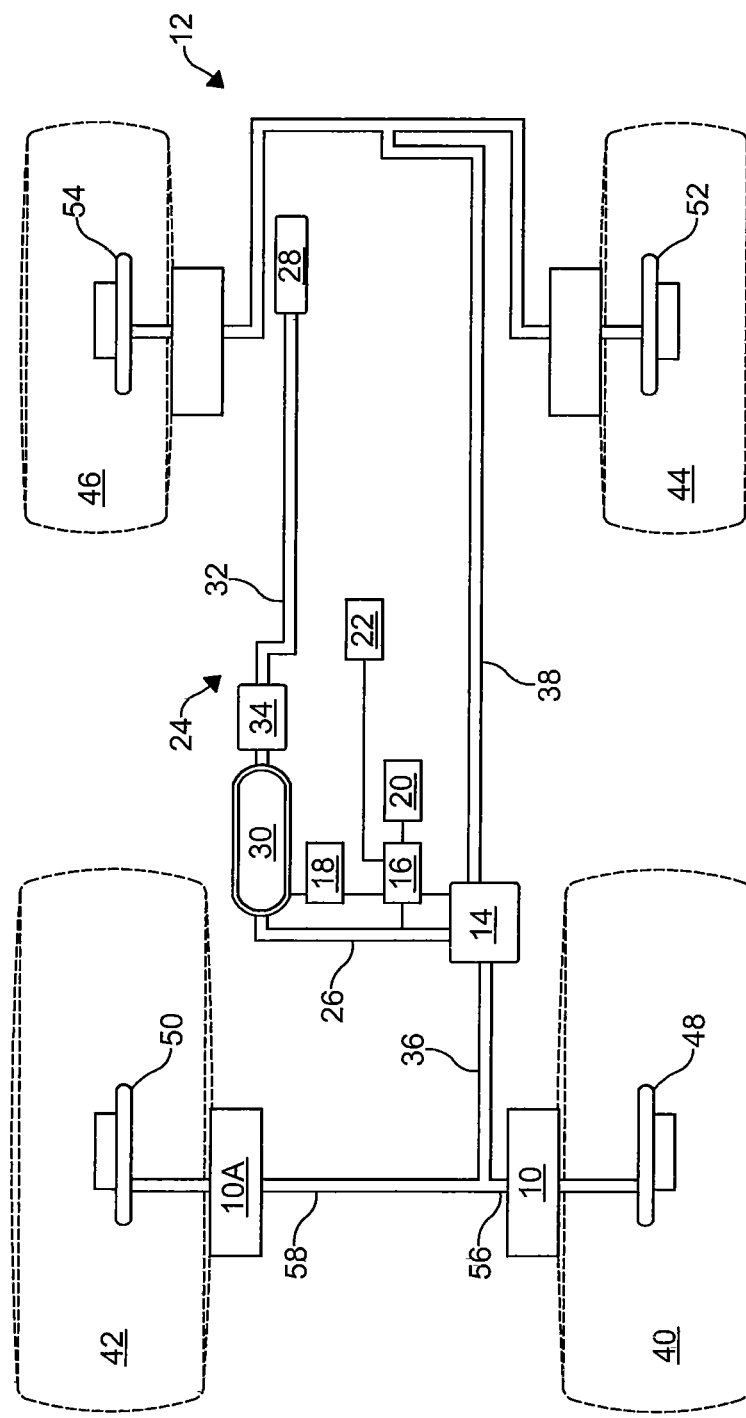
FIG. 1 is a schematic view of a tire inflation system for a vehicle.

It is to be understood that the invention may assume various alternative orientations and step sequences, except where expressly specified to the contrary. It is also to be understood that the specific assemblies and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A rotary joint assembly 10 is described herein. The rotary joint assembly 10 will be described in connection with a tire inflation system 12. The rotary joint assembly 10 will be described for use in transferring a pressurized fluid from a rotating portion of the tire inflation system 12 to a non-rotating portion of the tire inflation system 12 and vice versa. Preferably, the pressurized fluid is air. However, it should be appreciated that other pressurized fluids may be suitable for use with the rotary joint assembly.

Preferably, the tire inflation system 12 is a central tire inflation system. The rotary joint assembly 10 and tire inflation system 12 may have applications to passenger, commercial and off-highway vehicles such as, for example, trucks, tractors, earth-moving vehicles and military vehicles. The rotary joint assembly 10 could also have industrial, locomotive, and aerospace applications.

A schematic illustration of an embodiment of the tire inflation system 12 is illustrated in FIG. 1. The tire inflation system 12 comprises a pneumatic control portion 14. The pneumatic control portion 14 comprises a pressure sensor (not depicted) for measuring the pressure of air. Preferably, the pneumatic control portion 14 also comprises a plurality of valve assemblies (not depicted) which are of the solenoid variety, and one or more first fluid conduits for controlling the flow of and directing air through the system 12.

The tire inflation system also comprises an electronic control portion 16. The electronic control portion 16 may receive input signals from the pressure sensor, a power supply (not depicted) and one or more additional sensors (not depicted) such as, for example, a pressure switch 18 and a speed sensor 20. The electronic control portion 16 may also receive input signals from an operator control device 22. The electronic control portion 16 may include a microprocessor (not depicted) operating under the control of a set of programming instructions, which may also be referred to as software. The electronic control portion 16 may include a memory (not depicted) in which programming instructions are stored. The memory can also store identification codes, tire pressure records and/or user inputs over a period of time.

The electronic control portion 16 outputs signals to the pneumatic control portion 14 to, for example, open or close the valve assemblies. The electronic control portion 16 may also output signals to a display device (not depicted). The display device may be included as a part of the operator control device 22 or a freestanding device.

The pneumatic control portion 14 and the electronic control portion 16 each selectively communicate with an air supply 24 via an air supply circuit 26. The pressure sensor measures the pressure of the air supply 24 via the air supply circuit 26. The air supply 24 may be utilized to check the tire pressure and, if needed, increase and/or decrease the tire pressure.

The air supply 24 is preferably provided by an air compressor 28 attached to the vehicle. Preferably, the air supply 24 also comprises a reservoir 30 such as, for example, an air tank. The compressor 28 is in fluid communication with the reservoir 30 via a supply conduit 32. The air compressor 28 supplies pressurized air to the reservoir 30 for storage therein. Pressurized air from the air supply 24 is provided to the air supply circuit 26 via the reservoir 30. A drier 34 is provided for removing water from the air supply 24. A filter (not depicted) may also be interposed in the air supply circuit 26 or the supply conduit 32.

The pneumatic control portion 14 is also selectively in fluid communication with one or more fluid control circuits 36, 38. Each fluid control circuit 36, 38 is utilized to provide fluid communication between the pneumatic control portion 14 and one or more tires 40, 42, 44, 46. Fluid communication between the pneumatic control portion 14 and fluid control circuits 36, 38 is preferably controlled by opening or closing a valve assembly (not depicted).

Each tire 40, 42, 44, 46 contains air at a certain pressure which will hereinafter be referred to herein as tire pressure. Preferably, the tire pressure is equal to a target tire pressure. The target tire pressure can be selected to be a desired pressure. After the target tire pressure is selected, it is programmed into the electronic control portion 16. If it is determined that the tire pressure is less than the target tire pressure, the tire pressure can be increased. If it is determined that the tire pressure is greater than the target tire pressure, the tire pressure can be decreased. The tire inflation system 12 will be described below with reference to the tire pressure of one tire 40. However, the tire inflation system 12 may at certain times be in fluid communication with a plurality of tires 40, 42 in order to perform the aforementioned functions.

A wheel valve 48 is provided at an end of the fluid control circuit 36 to control the flow of pressurized air into and out of the tire 40. Preferably, a wheel valve 48, 50, 52, 54 is provided for each tire 40, 42, 44, 46 to control the flow of pressurized air into and out of the tire 40, 42, 44, 46. The wheel valves 48, 50, 52, 54 may be of any configuration known in the art.

The fluid control circuit 36 comprises the rotary joint assembly 10. The fluid control circuit 36 will be described with reference to one assembly 10. However, as illustrated in FIG. 1, the fluid control circuit 36 may comprise one or more rotary joint assemblies 10, 10A. For example, a first rotary joint assembly 10 associated with a tire 40 on a drive axle of the vehicle could be provided and a second rotary joint assembly 10A associated with another tire 42 on the drive axle could be provided. Preferably, the first rotary joint assembly 10 and the second rotary joint assembly 10A are similarly configured. The fluid control circuit 36 may also comprise one or more fluid conduits 56, 58.

The rotary joint assembly 10 is not limited to use with a drive axle. Thus, the rotary joint assembly 10 is suitable for use with, for example, a steer axle. The rotary joint assembly 10 is also suitable for use with a steerable axle. The steerable axle may be driven or non-driven.

Figure 2:
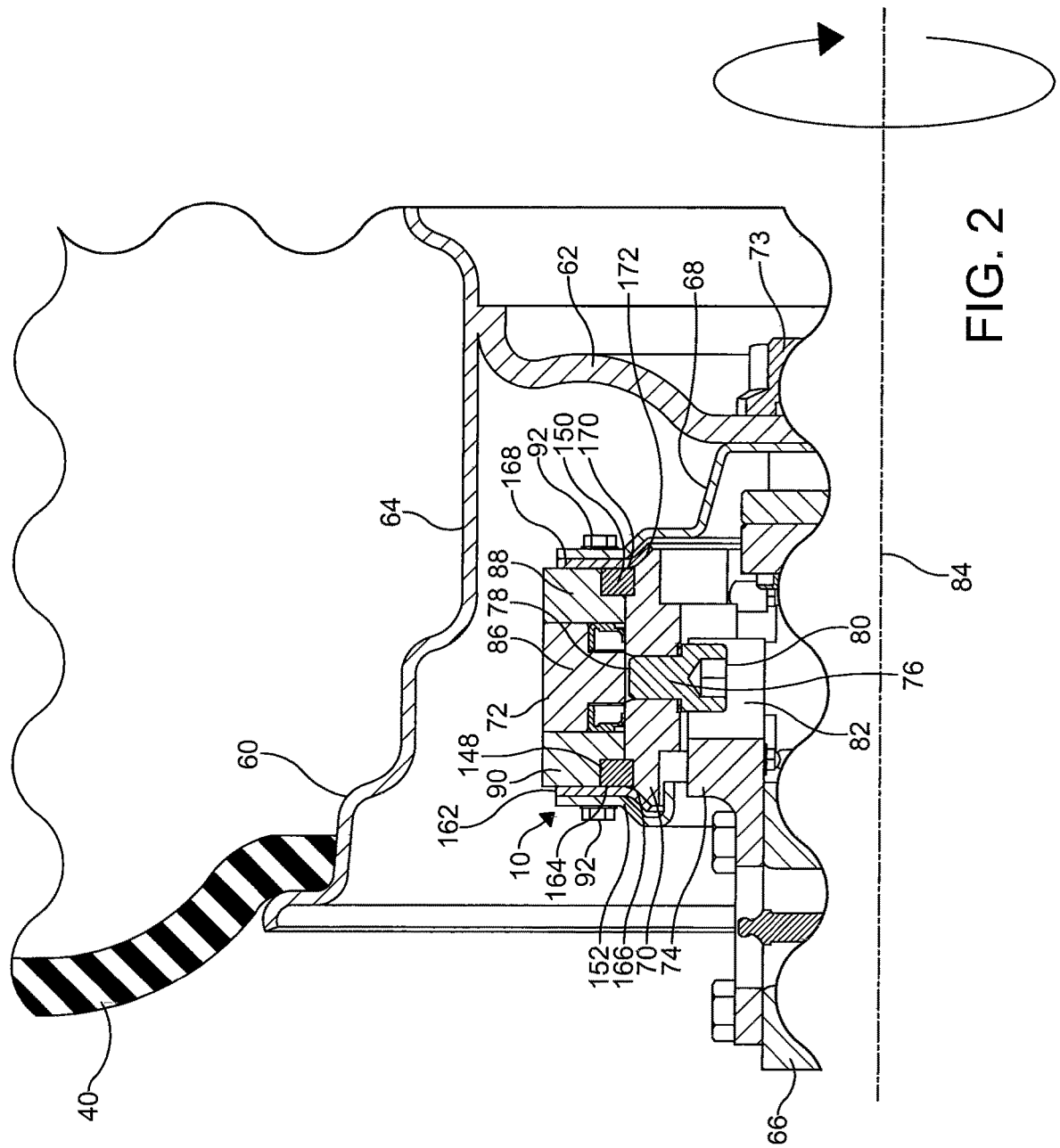
FIG. 2 is a partial sectional view of a portion of an embodiment of a rotary joint assembly of the tire inflation system of FIG. 1 in accordance with the invention.

Referring now to FIG. 2, the rotary joint assembly 10 is a generally annular member. The rotary joint assembly 10 is housed within a wheel rim 60. The wheel rim 60 supports the tire 40. In an embodiment, the rotary joint assembly 10 is provided inboard of an outboard wall portion 62 of the wheel rim 60 and within an inner diameter of an outer wall portion 64 of the wheel rim 60. In another embodiment, the rotary joint assembly 10 is positioned around and surrounds a portion of the axle 66. Preferably, the rotary joint assembly 10 is positioned at or near an end of the axle 66 and disposed thereabout. The rotary joint assembly 10 may be provided between the outer wall portion 64 of the wheel rim 60 and the axle 66. In this position, the rotary joint assembly 10 is provided around and surrounds a portion of the axle 66 and separates the outer wall portion 64 of the wheel rim 60 from the axle 66. Advantageously, the rotary joint assembly 10 is not integrated within the axle 66. Thus, the rotary joint assembly 10 can be attached to or removed from the wheel rim 60 without needing to disassembly the axle 66 which reduces maintenance costs and allows the assembly to be attached to the vehicle during the manufacture of the vehicle or added thereto in a post-manufacturing process.

The rotary joint assembly 10 is attached to the wheel rim 60 so that a portion thereof rotates with the wheel rim. As illustrated, the rotary joint assembly 10 may be attached to the outboard wall portion 62 of the wheel rim 60 via a flange 68. However, it should be appreciated that the rotary joint assembly may be attached to another portion of the wheel rim via the flange. Also, the rotary joint assembly 10 is attached to a non-rotating portion of the vehicle such as, for example, the chassis or an axle housing.

The rotary joint assembly 10 comprises a non-rotating portion 70 and a rotating portion 72. The rotating portion 72 is attached to the wheel rim 60 via the flange 68 and one or more fasteners 73 for rotation therewith. It should be appreciated that the rotating portion 72 may be attached to the wheel rim 60 in another manner. A fork 74 is utilized to attach the non-rotating portion 70 to the non-rotating portion of the vehicle. The fork 74 also helps to prevent the non-rotating portion 70 from rotating with rotating portion 72. On an end, the fork 74 is engaged with the non-rotating portion 70 via a screw 76. A first end 78 of the screw 76 is engaged with the non-rotating portion 70 via a threaded connection or in another manner. The screw 76 extends radially in from the non-rotating portion 70 toward the non-rotating portion of the vehicle. A second end 80 of the screw 76 is disposed in a cavity 82 provided in the fork 74. The screw 76 engages the fork 74 via an interference fit or in another manner to prevent rotation of the non-rotating portion 70. On another end the fork 74 can be attached to the non-rotating portion of the vehicle via mechanical fasteners, welding, an interference fit or in another suitable manner.

Figure 3:
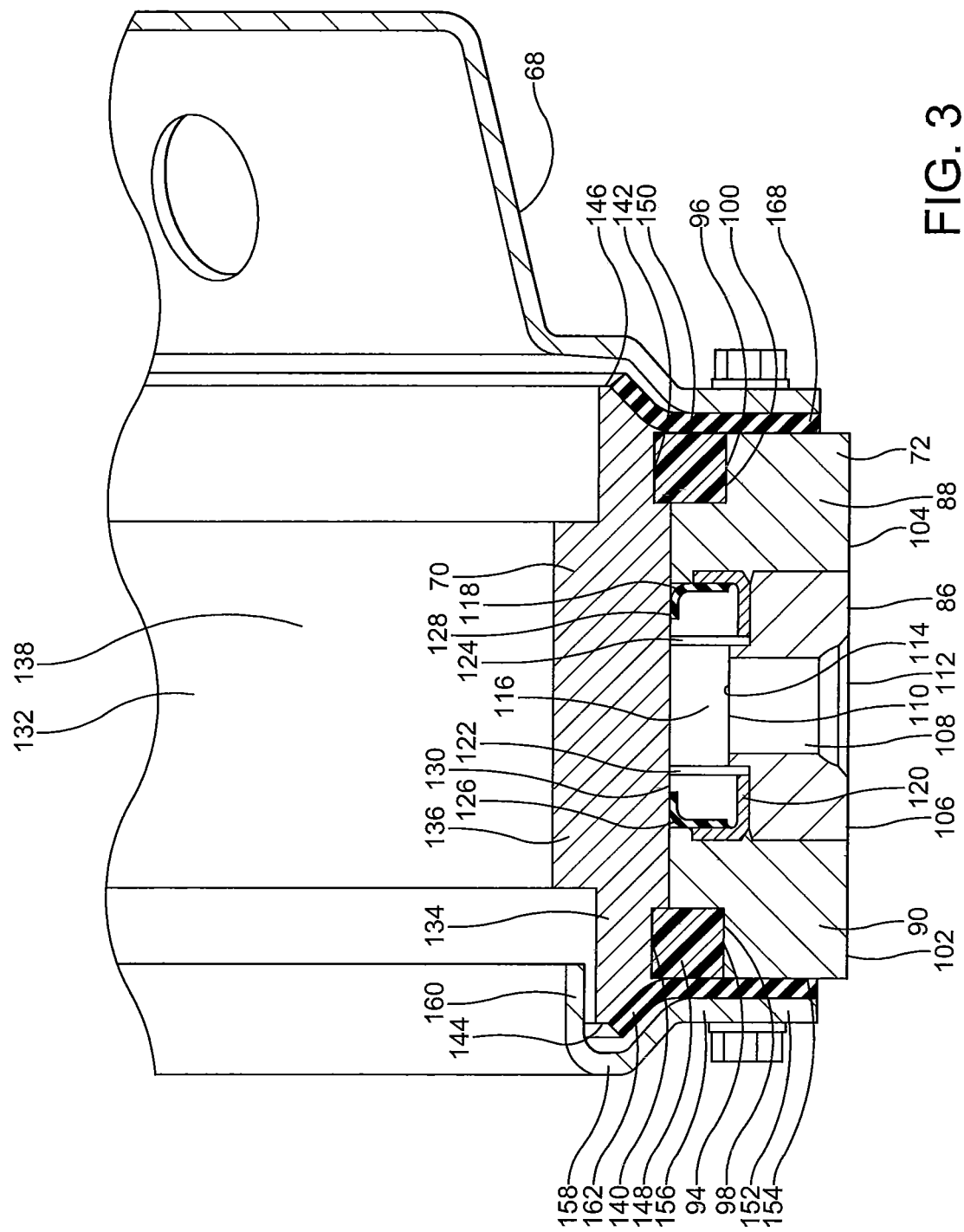
FIG. 3 is a partial sectional view of another portion of the rotary joint assembly of FIG. 2.

Referring now to FIGS. 2-3, the rotating portion 72 is a generally annular member which is disposed circumferentially around the non-rotating portion 70. The rotating portion 72 rotates about an axis of rotation 84. The axis of rotation 84 extends through the center of the rotary joint assembly 10. The axis of rotation may also extend through the center (not depicted) of the outboard wall portion of the wheel rim.

As noted above, the rotating portion 72 is a generally annular member. In an embodiment, the rotating portion 72 comprises a center portion 86. An outboard side portion 88 is attached to an outboard side of the center portion 86 and an inboard side portion 90 is attached to an inboard side of the center portion 86. One or more fasteners 92 may be utilized to attach the outboard side portion 88 and the inboard side portion 90 to the center portion 86. Each of the center portion 86, outboard side portion 88, and inboard side portion 90 may be generally annular.

An annular groove 94, 96 is provided in an inner surface 98, 100 of each of the outboard side portion 88 and the inboard side portion 90. Opposite the inner surfaces 98, 100 are respective outer surfaces 102, 104 of each portion 88, 90. The outer surfaces 102, 104 along with an outer surface 106 of the center portion 86 define the outer surface of the rotary joint assembly 10.

The rotating portion 72 has an air passageway 108 formed therein. In an embodiment, the rotating portion air passageway 108 is of a generally cylindrical shape and is formed through the center portion 86 of the rotating portion 72. Preferably, the air passageway 108 extends from the outer surface 106 to an inner surface 110 of the center portion 86 and is in a perpendicular relationship with the axis of rotation 84. However, in certain embodiments (not depicted), the air passageway may be provided at an oblique angle relative to the axis of rotation.

The rotating portion air passageway 108 is in fluid communication with the tire 40, the wheel valve 48, or another portion of the tire inflation system on an end 112. On an opposite end 114, the air passageway 108 is in fluid communication with an air passageway 115 provided in the non rotating portion 70 via a chamber 116 provided therebetween. The rotating portion air passageway 108 rotates relative to the non-rotating portion air passageway.

When air pressure is applied to either air passageway 108, 115, the chamber 116 between the non-rotating portion 70 and the rotating portion 72 is pressurized. The chamber 116 is annular and is also provided between a pair of annular sealing members 118, 120. The annular sealing members 118, 120 are spaced apart and define the inboard and outboard ends of the chamber 116. The annular sealing members 118, 120 are provided between opposing portions of the outboard side portion 88 and the inboard side portion 90 and circumferentially about the axis of rotation 84.

A pair of spacers 122, 124 are disposed in the chamber 116. Each spacer 122, 124 is an annular member and contacts a sealing surface 130 of the non-rotating portion 70 and an inner surface of the center portion 86 of the rotating portion 72. Each spacer 122, 124 abuts one of the annular sealing members 118, 120 to help maintain the orientation and position of the member relative to the chamber 116. The spacers 122, 124 are provided on opposite sides of an annular protuberance formed in the center portion 86. Also, the annular sealing members 118, 120 are provided on opposite sides of an annular protuberance. Each spacer 122, 124 abuts the annular protuberance and separates an annular sealing member 118, 120 from the annular protuberance. In an embodiment, the air passageway 108 formed in the rotating portion 72 extends through the annular protuberance. In this embodiment, a portion of each spacer 122, 124 is provided between the annular sealing member 118, 120 it abuts and the air passageway 108.

Preferably, the annular sealing members 118, 120 are sealingly attached to the rotating portion 72 and each have a lip seal 126, 128 that sealingly contacts the sealing surface 130 of the non-rotating portion 70. More particularly, a portion of the outboard annular sealing member 118 is attached to the inner surface 110 of the center portion 86 and an inboard surface of the outboard side portion 88 and a portion of the inboard annular sealing member 120 is attached to the inner surface 110 of the center portion 86 and an outboard surface of the of the inboard side portion 90. The annular sealing members 118, 120 can be formed from any suitable material. However, it is preferred that the lip seals 126, 128 comprise PTFE.

Figure 4:
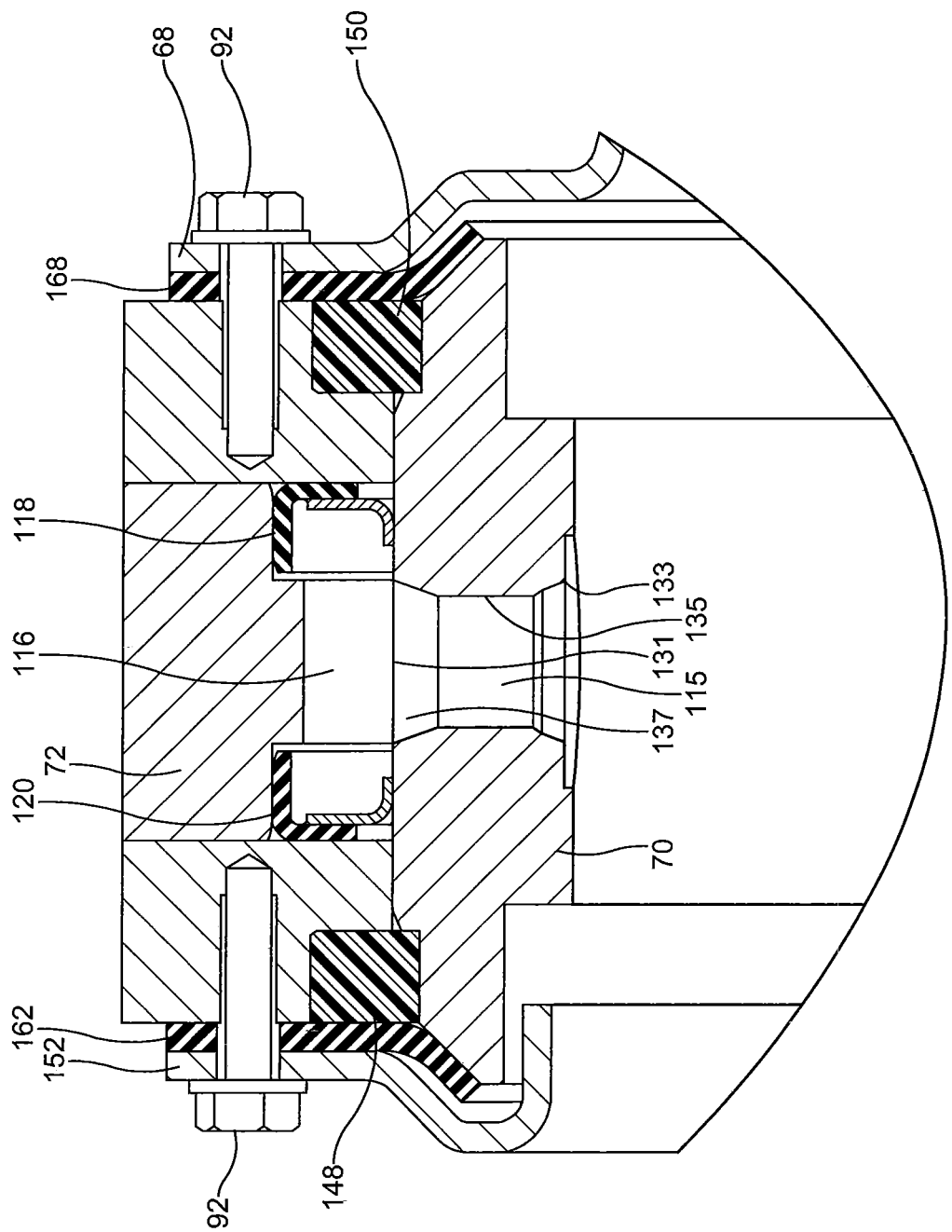
FIG. 4 is a partial sectional view of another portion of the rotary joint assembly of FIG. 2.

Referring now to FIG. 4, the air passageway 115 provided in the non-rotating portion 70 is in fluid communication with the air passageway 168 in the rotating portion 72 on an end 131 thereof via the chamber 116 and a remaining portion of the fluid control circuit 36, the fluid conduit 56, the pneumatic control portion 14 and/or another portion of the tire inflation system 12 on an opposite end 133 thereof. The non-rotating portion air passageway 115 is stationary relative to the rotating portion air passageway 108. The non-rotating portion air passageway 115 comprises a first portion 135. The first portion 135 is of a general cylindrical shape. The non-rotating portion air passageway 115 also comprises a second portion 137. The second portion 137 gradually increases in diameter to and toward the chamber 116 and is of a frusto-conical shape in cross-section. The second portion 137 is in direct fluid communication with the chamber 116 and is provided between the chamber 116 and the first portion 135 of the non-rotating portion air passageway 115. The first portion 135 is provided between the fluid conduit 56 and the second portion 137 of the non-rotating portion air passageway 115.

Referring back to FIGS. 2-3, it is preferred that the non-rotating portion 70 is formed from a single annular body. The rotary joint assembly comprises a central opening 132 that is defined by the non-rotating portion 70. The non-rotating portion 70 comprises a first portion 134 and a second portion 136. The sealing surface 130 is provided as a part of the first portion 134 and is the radially outermost portion of the non-rotating portion 70. In this position, the sealing surface 130 faces the rotating portion 72. In an embodiment, the first portion 134 has a generally frusto-conical shape in cross-section. In this embodiment, the first portion 134 is of a width that is greater than a width of the second portion 136. The second portion 136 is formed in a unitary manner with the first portion 134 and is the radially innermost portion of the non-rotating portion 70. The second portion 136 has a rectangular shape in cross-section. An inner surface 138 of the second portion 136 defines the central opening 132. The central opening 132 is positioned around a portion of the axle 66.

A pair of annular grooves 140, 142 are provided in the sealing surface 130. More particularly, an inboard groove 140 is provided adjacent an inboard end 144 of the non-rotating portion 70 and an outboard groove 142 is provided adjacent an outboard end 146 of the non-rotating portion 70. Preferably, an inboard bushing 148 is disposed in the inboard groove 140 and an outboard bushing 150 is disposed in the outboard groove 142. The inboard bushing 148 is also disposed in the annular groove 98 provided in the inner surface 98 of the inboard side portion 90. Also, the outboard bushing 150 is disposed in the annular groove 96 provided in the inner surface 100 of the outboard side portion 88. The bushings 148, 150 facilitate rotation of the rotating portion 72 about the axis of rotation 84 relative to the non-rotating portion 70. In an embodiment, the bushings 148, 150 comprise a plastic material. However, in other embodiments (not depicted), the inboard bushing 148 may be replaced by an inboard bearing and the outboard bushing 150 may be replaced by an outboard bearing. In these embodiments, the inboard bearing is disposed in the inboard groove and the outboard bearing is disposed in the outboard groove to facilitate the movement of the rotating portion relative to the non-rotating portion.

An inboard cover member 152 is attached to an inboard surface 154 of the inboard side portion 90 adjacent the inboard bushing 148. The inboard cover member 152 is annular and comprises a radially extending portion 156 attached to a curved portion 158. The curved portion 158 is provided inboard of the inboard end 144 of the non-rotating portion 70. The curved portion 158 is attached to an axially extending portion 160. The axially extending portion 160 extends past the inboard end 144 of the non-rotating portion 70 and toward the second portion 136 of the non-rotating portion 70.

An inboard seal member 162 is provided between the inboard cover member 152 and the inboard side portion 90 of the rotating portion 72. The inboard seal member 162 sealingly contacts the inboard cover member 152 and the inboard side portion 90 to prevent the ingress of dust and water into the rotary joint assembly 10. The inboard seal member 162 extends radially to sealingly contact an inboard surface 164 of the inboard bushing 148 and an inboard surface 166 of the non-rotating portion 70 to prevent the ingress of dust and water into the rotary joint assembly 10. More particularly, the inboard seal member 162 sealingly contacts and is disposed on an inboard ramped surface of the first portion 134. An outboard seal member 168 is provided between the outboard side portion 88 of the rotating portion 72 and the flange 68. The outboard seal member 168 sealingly contacts the outboard side portion 88 and the flange 68 to prevent the ingress of dust and water into the rotary joint assembly. The outboard seal member 168 extends radially to sealingly contact an outboard surface 170 of the outboard bushing 148 and an outboard surface 172 of the non-rotating portion 70 to prevent the ingress of dust and water into the rotary joint assembly 10. More particularly, the outboard seal member 168 sealingly contacts and is disposed on an outboard ramped surface of the first portion 134. Each seal member 162, 168 may be generally annular, formed from an elastomeric material, and attached to the rotary joint assembly 10 via the one or more fasteners 92.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A rotary joint assembly for a tire inflation system, comprising:
    a rotating portion attached to a wheel rim for rotation therewith, wherein the rotating portion comprises three separate annular portions of: a center portion, inboard portion, and outboard portion, and the center portion has an air passageway formed therein;
    a non-rotating portion having a non-rotating portion air passageway formed therein, the non-rotating portion air passageway being in fluid communication with the air passageway formed in the rotating portion via a chamber;
    the chamber formed by an outer sealing surface of the non-rotating portion, an inner surface of the center portion of the rotating portion, and inner surfaces of the inboard portion and outboard portions of the rotating portion;
    a pair of annular sealing members attached to the inner surface of the center portion of the rotating portion and the inner surfaces of the inboard portion and outboard portions of the rotating portion, and each annular sealing member having a lip seal sealingly contacting the outer sealing surface of the non-rotating portion, wherein the annular sealing members define an inboard end and an outboard end of the chamber; and
    an inboard bushing or an inboard bearing disposed in an inboard groove formed in the sealing surface and an outboard bushing or an outboard bearing disposed in an outboard groove formed in the sealing surface.

2. The rotary joint assembly according to claim 1, wherein the rotating portion is attached to an outboard wall portion of the wheel rim via a flange and a fastener, and
    wherein the outboard portion and the center portion of the rotating portion connected by the fastener.

3. The rotary joint assembly according to claim 1, wherein the outboard side portion is attached to an outboard side of the center portion by a fastener, the inboard side portion is attached to an inboard side of the center portion by a second fastener.

4. The rotary joint assembly according to claim 1, further comprising an annular protuberance of the center portion and two spacers, and each spacer positioned between a side of the annular protuberance and one of the annular sealing members.

5. The rotary joint assembly according to claim 1, wherein the non-rotating portion air passageway comprises a first portion, which is of a generally cylindrical shape, and a second portion, which gradually increases in diameter toward the chamber.

6. The rotary joint assembly according to claim 1, wherein the rotary joint assembly is a generally annular member which comprises a central opening that is positioned around a portion of an axle and separates a portion of the axle from a portion of an outer wall portion of the wheel rim.

7. A rotary joint assembly for a tire inflation system, comprising:
    a rotating portion attached to a wheel rim for rotation therewith, wherein the rotating portion comprises a center portion which has an air passageway formed therein;
    a non-rotating portion having a non-rotating portion air passageway formed therein, the non-rotating portion air passageway being in fluid communication with the air passageway formed in the rotating portion via a chamber;
    a pair of annular sealing members attached to the rotating portion and sealingly contacting a sealing surface of the non-rotating portion, wherein the annular sealing members define an inboard end and an outboard end of the chamber;
    an inboard bushing or an inboard bearing disposed in an inboard groove formed in the sealing surface and an outboard bushing or an outboard bearing disposed in an outboard groove formed in the sealing surface; and
    a screw, the screw engaged with the non-rotating portion via a threaded connection and extending radially into a cavity to engage a fork via an interference fit.

8. The rotary joint assembly according to claim 1, further comprising an inboard cover member and an inboard seal member, the inboard seal member extending radially to sealingly contact an inboard surface of the inboard bushing or inboard bearing, an inboard surface of the non-rotating portion and the inboard portion of the rotating portion, and the inboard cover member covering an exterior of the inboard seal member.

9. The rotary joint assembly according to claim 1, further comprising an outboard seal member which sealingly contacts an outboard side portion of the rotating portion, the outboard bushing or bearing, and the non-rotating portion, and
    a flange to prevent the ingress of dust and water into the rotary joint assembly, wherein the flange attaches the rotating portion to the wheel rim.

10. The rotary joint assembly according to claim 7, further comprising a pair of spacers disposed in the chamber, wherein one of the spacers of the pair of spacers abuts one of the annular sealing members of the pair of annular sealing members.

11. The rotary joint assembly according to claim 1, wherein the sealing surface is the radially outermost portion of the non-rotating portion.

12. The rotary joint assembly according to claim 1, wherein the non-rotating portion comprises a first portion, which has a generally frustoconical shape in cross-section, and a second portion, which has a rectangular shape in cross-section and wherein the first portion and the second portion are formed in a unitary manner with each other and the first portion is of a width that is greater than a width of the second portion.

13. The rotary joint assembly according to claim 1, wherein the non-rotating portion comprises a first portion which has a generally frustoconical shape in cross-section.

14. The rotary joint assembly according to claim 7, further comprising an annular inboard seal member sealingly contacting an inboard side portion of the rotating portion and extending radially to sealingly contact an inboard surface of the non-rotating portion.

15. The rotary joint assembly according to claim 7, further comprising an annular outboard seal member sealingly contacting an outboard side portion of the rotating portion and extending radially to sealingly contact an outboard surface of the non-rotating portion.

16. The rotary joint assembly according to claim 1, wherein the inboard bushing or inboard bearing is disposed in an annular groove provided in an inboard side portion of the rotating portion and the outboard bushing or outboard bearing is disposed in an annular groove provided in an outboard side portion of the rotating portion.

17. The rotary joint assembly according to claim 5, wherein the second portion of the non-rotating portion air passageway is in fluid communication with the chamber and is provided between the chamber and the first portion of the non-rotating portion air passageway.

18. The rotary joint assembly according to claim 1, further comprising two spacers which extend from the inner surface of the center portion of the rotating portion to the outer sealing surface of the non-rotating portion.

19. The rotary joint assembly according to claim 1, further comprising two spacers which each abut an inner side of the annular sealing members and extend from the inner surface of the center portion of the rotating portion to the outer sealing surface of the non-rotating portion.

20. The rotary joint assembly according to claim 1, further comprising fasteners, wherein the fasteners extend inward from an inboard side of the inboard portion of the rotating portion and extend inward from an outboard side of the outboard portion of the rotating portion to fasten the three separate annular portions together,
    an inboard seal member positioned between one of the fasteners and the inboard portion of the rotating portion, and
    an outboard seal member positioned between one of the fasteners and the outboard portion of the rotating portion.

\* \* \* \* \*